(12) United States Patent
Kretz

(10) Patent No.: US 8,478,241 B2
(45) Date of Patent: Jul. 2, 2013

(54) PREVENTION OF UNSOLICITED MESSAGES

(75) Inventor: Martin Kretz, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1415 days.

(21) Appl. No.: 11/720,938

(22) PCT Filed: Dec. 5, 2005

(86) PCT No.: PCT/EP2005/056453
§ 371 (c)(1),
(2), (4) Date: Nov. 14, 2007

(87) PCT Pub. No.: WO2006/063944
PCT Pub. Date: Jun. 22, 2006

(65) Prior Publication Data
US 2008/0194241 A1 Aug. 14, 2008

Related U.S. Application Data

(60) Provisional application No. 60/638,770, filed on Dec. 22, 2004.

(30) Foreign Application Priority Data

Dec. 16, 2004 (EP) .................................. 04029790

(51) Int. Cl.
*H04M 3/42* (2006.01)
(52) U.S. Cl.
USPC .............. 455/412.2; 455/412.1; 455/417; 709/207; 709/206; 709/223; 709/154

(58) Field of Classification Search
USPC .................. 455/412.1, 414.1, 417; 709/202, 709/225
See application file for complete search history.

(56) References Cited

U.S. PATENT DOCUMENTS

| | | | |
|---|---|---|---|
| 6,732,149 | B1 | 5/2004 | Kephart |
| 2003/0088627 | A1 | 5/2003 | Rothwell et al. |
| 2004/0019651 | A1 | 1/2004 | Andaker |
| 2004/0176072 | A1 | 9/2004 | Gellens |
| 2004/0177110 | A1* | 9/2004 | Rounthwaite et al. ........ 709/202 |
| 2005/0144279 | A1* | 6/2005 | Wexelblat ..................... 709/225 |
| 2006/0053199 | A1* | 3/2006 | Pricken et al. ................ 709/206 |

FOREIGN PATENT DOCUMENTS

KR 2003-0069567 8/2003

OTHER PUBLICATIONS

International Search Report for corresponding Application No. PCT/EP2005/056453 mailed Feb. 27, 2006.

* cited by examiner

*Primary Examiner* — Kathy Wang-Hurst
(74) *Attorney, Agent, or Firm* — Renner, Otto, Boisselle & Sklar, LLP

(57) ABSTRACT

A method for gathering information relating to unsolicited messages. The method comprises deleting in a handheld communication device (1, 100, 200) message information associated with an unsolicited message. In response to deleting the message, information data, which is associated with the deleted message information or the unsolicited message, is forwarded to a message information unit (104, 224). Data information in a memory of said message information unit is updated based on the forwarded data associated with the unsolicited message. A method for blocking messages pertaining to data information stored in the message information unit is also disclosed.

26 Claims, 4 Drawing Sheets

PREVENTION OF UNSOLICITED MESSAGES

This application is a §371 of International Application No. PCT/JP2005/056453 filed on Dec. 5, 2005, which claims benefit to U.S. Provisional Application No. 60/638,770 filed on Dec. 22, 2004, and also claims priority to European Application No. 04029790.5 filed on Dec. 16, 2004.

TECHNICAL FIELD OF THE INVENTION

The present invention relates to a method and a handheld communication device for gathering information relating to an unsolicited message. The invention also relates to a method and a device for blocking a message to be notified in a handheld communication device.

DESCRIPTION OF RELATED ART

A handheld communication device may receive messages, which are considered by the recipient as being unsolicited messages, also known as a spam or spim (spam message relating to instant messaging) messages. This has become an increasing problem for a user of a handheld communication device. An unsolicited message may be a purely text message, such as an SMS (Short Message Service) message, an image, a video, or an audio message, or a combination thereof. The message may be conveyed in an SMS message, an MMS (Multimedia Message Service) message, an e-mail, or a WAP-push (Wireless Application Protocol) message, or a message from an instant message application. A voice message, such as a commercial call generated by a human being, or a commercial call with a recorded voice message initiated by a computer may also be an unsolicited message. One example of such a SPAM is a SMS message received when passing the boarder between two countries, informing of operator services in the arriving country.

If an unsolicited message is received by a handheld communication device according to the prior art, it will normally be notified since the device generally does not comprise any filter for blocking an unsolicited message. After notification, the user may delete the message information relating to the message before or after having read it. If the messages are not deleted, the result may be that the memory of the handheld device becomes full and further important messages may become lost.

If the message is a phone call, the situation is different. If it is an unsolicited call, the phone number of the calling part may be withheld, in which case the user is not able do determine whether it is an unsolicited call or a solicited call, if the phone used has a number presentation service.

Thus, there is a need for a method for preventing unsolicited messages from being received or notified. As the number of unsolicited messages is increasing, this need is becoming more urgent. The problem appears irrespective of the type of message.

Some mobile telephones comprise a call manager for managing incoming calls. The call manager may be set to restrict calls on a general level, e.g. prevent all incoming calls, or calls incoming during roaming. Furthermore, the call manager may be set to restrict calls on a strict level, whereby calls received from another user having a telephone number entered on a list within the mobile telephone is accepted or rejected. The user of the mobile telephone may create the list manually. However, such a call manager is not particularly effective for preventing unsolicited calls. Although some unsolicited calls may be blocked if incoming calls are restricted on the general level, other unsolicited calls may pass through. A use of the strict level in the call manager may solve the problem of unsolicited calls. However, this would limit the usability of the mobile telephone severely, as it may be desired to receive solicited calls from users having telephone numbers not entered on the list.

SUMMARY OF THE INVENTION

It is an object of the invention to gather information associated with unsolicited messages in a communication network.

The object is achieved according to a first aspect by a method for gathering information relating to unsolicited messages. The method comprises deleting in a handheld communication device message information associated with an unsolicited message. Message data associated with the deleted message information or the unsolicited message is forwarded to a message information unit. Data information in a memory of said message information unit is updated based on said forwarded data associated with said unsolicited message.

Message data extracted from an incoming message, which is addressed to the handheld communication device, may be compared with said data information stored in the message information unit to determine whether the message should be notified in or forwarded to the handheld communication unit. The notification may be issued or the message may be forwarded if the data information stored in the message information unit does not comprise any data information related to the message data extracted from the incoming message; or if the data information is related to the message data extracted from the incoming message and a counter value indicating the number of times the stored information has been encountered is lower than a predetermined number.

The message information unit may be located in the handheld communication device.

At least a portion of the stored data information may be exported to an external electronic communication device. The message data associated with the deleted message information may be forwarded to a network node, in which the message information unit may be located. Information in the message information unit may be transmitted from the network node to at least a further network node.

According to a second aspect, the object is achieved by a method for blocking a message intended for and addressed to a handheld communication device operative in a communication network. The communication device or the communication network comprises a message information unit comprising data information related to messages determined to be unsolicited. The method comprises extracting message data from the message intended for the handheld communication device; and comparing the message data with the data information stored in said message information unit to determine whether the message should be notified in or transmitted to the handheld communication device being addressed in the message.

The data information in the message information unit arranged in a network node may be transmitted from the network node to at least one handheld communication device operative in the domain of the network node. The data information in the message information unit may be transmitted in response to the handheld communication device signing in at the domain of the network node. The step of comparing may be carried out in the addressed handheld communication device.

At least a portion of the stored data information may be exported to an external electronic communication device. The step of comparing may be carried out in the network node.

The message may be transmitted to the addressed handheld communication device. A scanning request sent from the handheld communication device may be transmitted to the network node, and in response thereto the step of comparing may be carried out. A scanning response with information of the outcome of the step of comparing may also be transmitted.

According to a third aspect, the object is achieved by a device for gathering information relating to unsolicited messages. The device comprises a controller configured to delete in a handheld communication device message information associated with an unsolicited message. The controller is configured to forward message data, associated with the deleted message information or the unsolicited message, to a message information unit. The message information unit is configured to update data information in a memory of said message information unit based on said forwarded message data associated with said unsolicited message.

The controller may be configured to be responsible for issuing the notification or forwarding the message; if the data information stored in the message information unit does not comprise any data information related to the message data extracted from the incoming message; or if the data information is related to the message data extracted from the incoming message and a counter value indicating the number of times the stored information has been encountered is lower than a predetermined number.

The device may be included in a handheld communication device, in which the message information unit may be located.

The controller may be configured to be responsible for exporting at least a portion of the stored data information to an external electronic communication device.

The controller may be configured to be responsible for forwarding the data associated with the deleted information to a network node, in which the message information unit may be located.

The controller may be configured to be responsible for transmitting information in the message information unit from the network node to at least a further network node.

The device may be included in a portable radio communication equipment, a mobile radio terminal, a pager, a communicator, an electronic organizer, a personal digital assistant (PDA), a handheld computer, a handheld VoIP telephone, a smartphone, or a network node. The device may also be included in a mobile telephone.

According to a fourth aspect, the object is achieved by a device for blocking a message intended for and addressed to a handheld communication device operative in a communication network. The device comprises a message information unit comprising data information related to messages determined to be unsolicited; and a controller for extracting message data from the message intended for the handheld communication device, and for comparing the message data with said data information stored in said message information unit to determine whether the message should be notified in or transmitted to the handheld communication device being addressed in the message.

The message information unit and the controller may be arranged in a network node. The controller may be configured to be responsible for transmitting the data information in the message information unit from the network node to at least one handheld communication device operative in the domain of the network node.

The controller may be configured to transmit the data information in the message information unit in response to the handheld communication device signing in at the domain of the network node.

The controller may be configured to be responsible for exporting at least a portion of the stored data information to an external electronic communication device.

The controller may be configured to be responsible for exporting at least a portion of the stored message information to an external electronic communication device.

The controller may be located in a network node.

The controller may be configured to be responsible for transmitting the message to the addressed handheld communication device; receiving a scanning request sent from the handheld communication device to the network node, and in response thereto carrying out the step of comparing; and transmitting a scanning response with information of the outcome of the step of comparing.

The device may be included in a portable radio communication equipment, a mobile radio terminal, a pager, a communicator, an electronic organizer, a personal digital assistant (PDA), a handheld computer, a handheld VoIP telephone, or a smartphone, which is the addressed handheld communication device. Furthermore, the device may be included in a mobile telephone, which may be the addressed handheld communication device.

According to a fifth aspect, the object is achieved by a computer program product comprising computer program code means to execute the method for gathering information when said computer program code means is run by an electronic device having computer capabilities.

According to a sixth aspect, the object is achieved by a computer program product comprising computer program code means to execute the method for blocking a message when said computer program code means is run by an electronic device having computer capabilities.

Further embodiments of the invention are defined in the dependent claims.

It is an advantage of the invention that an unsolicited message may be blocked from notification in a handheld communication device. Furthermore, it is an advantage that information associated with messages reported as unsolicited may be shared such that notification of unsolicited messages can be minimized, wherein power may be saved in the handheld communication devices in which the message is not notified.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features, and advantages of the invention will appear from the following description of several embodiments of the invention, wherein various aspects of the invention will be described in more detail with reference to the accompanying drawings, in which.

DETAILED DESCRIPTION OF EMBODIMENTS

Figure 1:
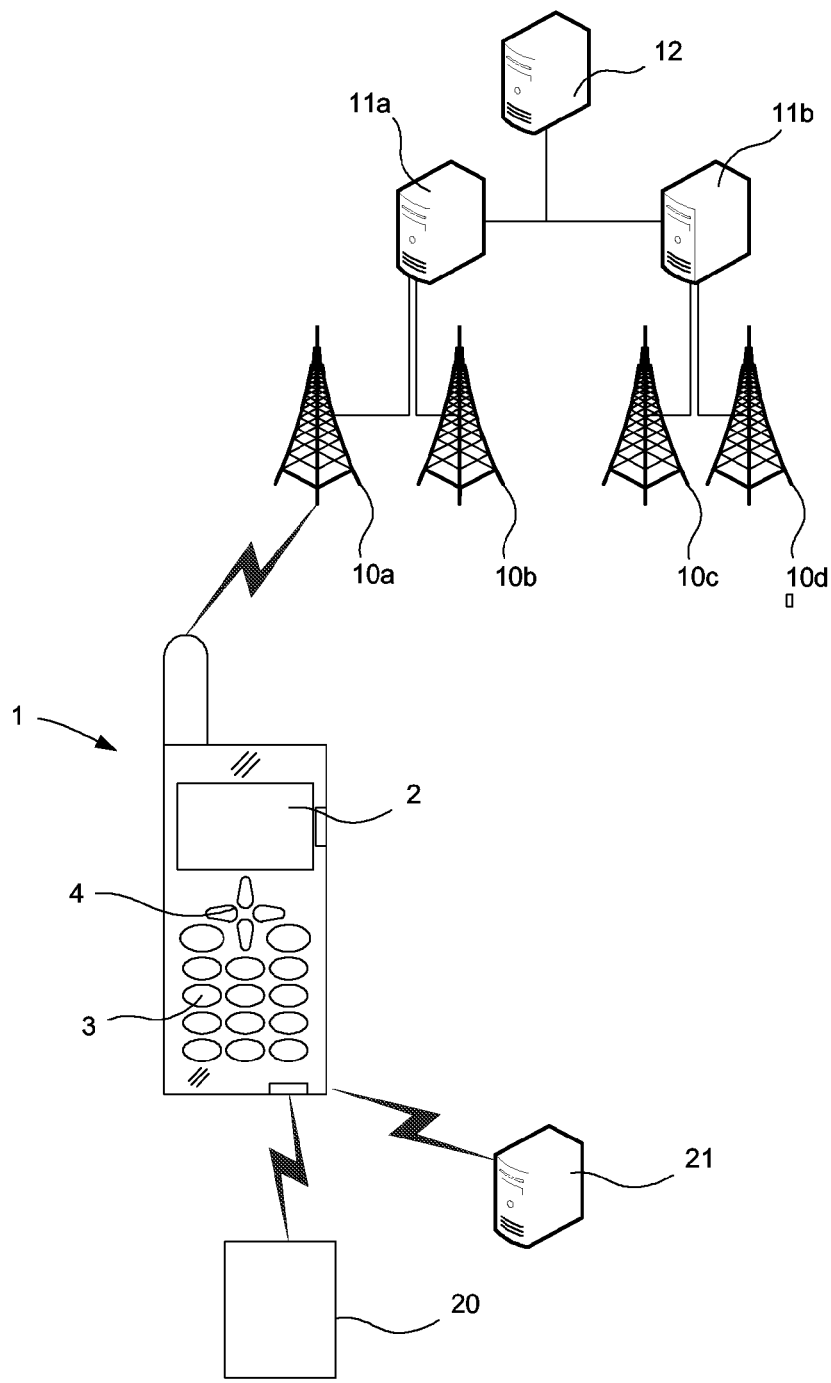
FIG. 1 is a schematic view of a handheld communication device connected to a communication network.

FIG. 1 illustrates a handheld communication device 1 operative in a communication network. The handheld communication device 1 may receive messages from and transmit messages to network nodes of the communication network. The communication network may comprise base stations 10a, 10b, 10c, 10d. Each base station 10a, 10b, 10c, 10d may be connected to a base station controller 11a, 11b, which controls signal traffic relayed to/from the handheld communication device 1 via the base stations 10a, 10b, 10c, 10d. Each base station controller 11a, 11b may control and monitor one or several base stations 10a, 10b, 10c, 10d. Furthermore, each base station controller 11a, 11b may be connected to one or several mobile switching centers 12, which may be the interface between the communication network and another network, such as a public switched telecommunication network (PSTN) and/or an information network, such as the Internet.

In FIG. 1, the handheld communication device is exemplified as a mobile telephone. In other embodiments, the handheld communication device is a portable radio communication equipment, a mobile radio terminal, a pager, a communicator, an electronic organizer, a personal digital assistant (PDA), a handheld computer, a handheld VoIP (Voice over IP (Internet Protocol)) telephone or a smartphone. Furthermore, in FIG. 1 the communication network comprises base stations. However, the network need not be a wireless communication network. In another embodiments it is a wire line based network, such as a packet switched network, e.g. the Internet, comprising network nodes. Such a network may be suitable for VoIP telephony.

The handheld communication device 1 may also be connected to an external communication device 20 via a short-range communication link, such as a wireless radio link or an IR (Infra Red) link, or a cable connection. Alternatively or additionally, the handheld communication device 1 may be connected to a local area network (LAN) comprising a network server 21.

If an unsolicited message is received by the handheld communication device 1, message information associated with the unsolicited message may be temporarily stored. When the unsolicited message is determined or classified as unsolicited and the message information associated with and the message is deleted, data associated with the deleted information, and thus with the unsolicited message, may be forwarded to a message information unit (MIU) 104, 134, 224 (see FIGS. 2 and 3) for storing data information associated with unsolicited messages. The MIU 104, 134, 224 may be located in the handheld communication device 1, in a network node, such as in either or both of the base station controller 11a, 11b and the mobile switching center 12, or the server 21. Before an incoming message is notified in or forwarded to the handheld communication device 1, the message itself or message data thereof may be compared to the data information in the MIU 104, 134, 224 to determine whether a notification of the message should be issued or the message should be blocked. Thus, blocking of the message may be determined within the network node or within the handheld electronic device 1. The data information in the MIU 104 may also be shared or exported to with the external communication device 20 and/or the network server 21.

Figure 2:
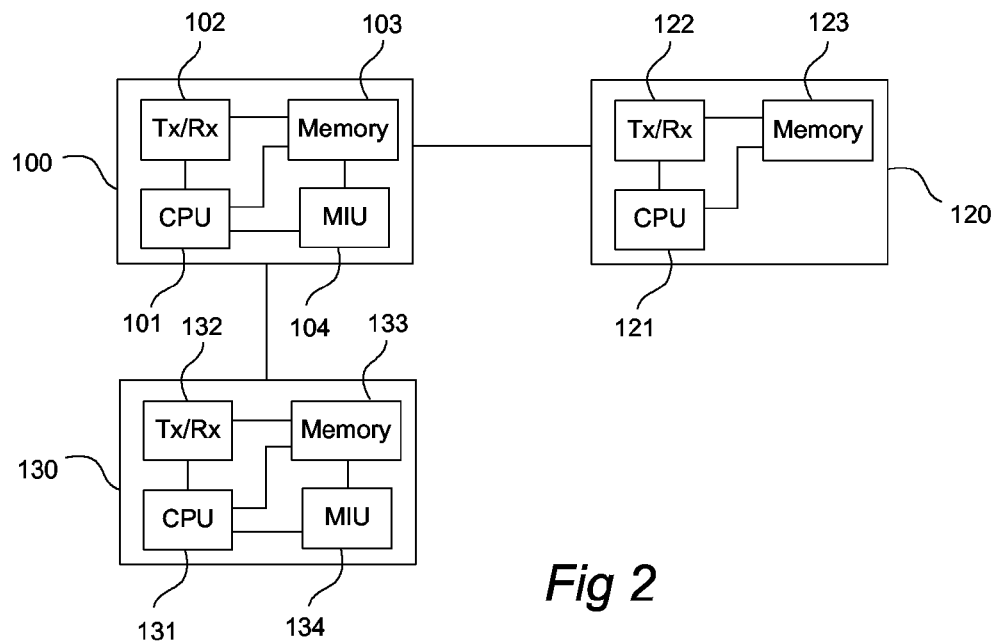
FIG. 2 a is a block diagram of one embodiment of a handheld communication device connected to a network node.

FIG. 2 illustrates one embodiment of a handheld communication device 100 comprising a controller 101, such as a CPU (Central Processing Unit), a transmitter/receiver (Tx/Rx) unit 102, a memory 103 and the MIU 104. The handheld communication device 100 may be connected to a network node 120 comprising a controller 121, such as a CPU, a Tx/Rx unit 122, and a memory 123. Messages received in the network node may be forwarded immediately. Alternatively, the message is temporarily stored in the network node 120, whereupon a notification is issued and the message is forwarded on request. The handheld communication device 100 may also be connected to an external communication device 130 comprising a controller 131, a Tx/Rx unit 132, a memory 133, and an MIU 134.

Figure 3:
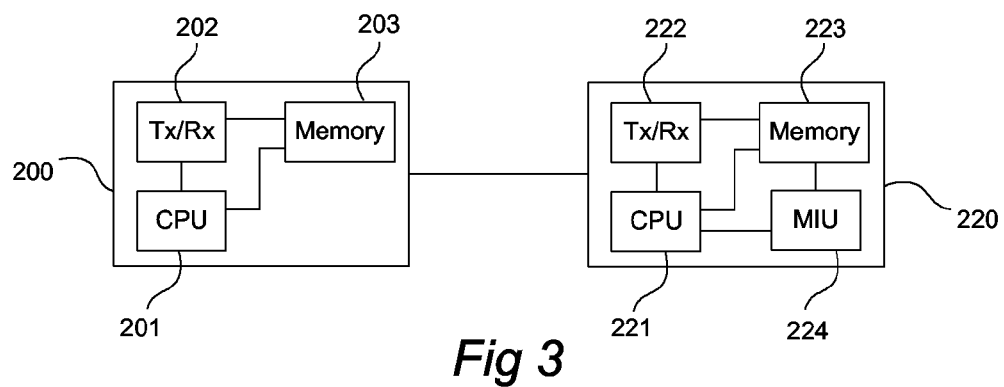
FIG. 3 is a block diagram of another embodiment of a handheld communication device connected to a network node.

FIG. 3 illustrates another embodiment of a handheld communication device 200 comprising a controller 201, a Tx/Rx unit 202, and a memory 203. The handheld communication device 200 may be connected to a network node 220 comprising a controller 221, a Tx/Rx unit 222, a memory 223, and an MIU 224.

Figure 4:
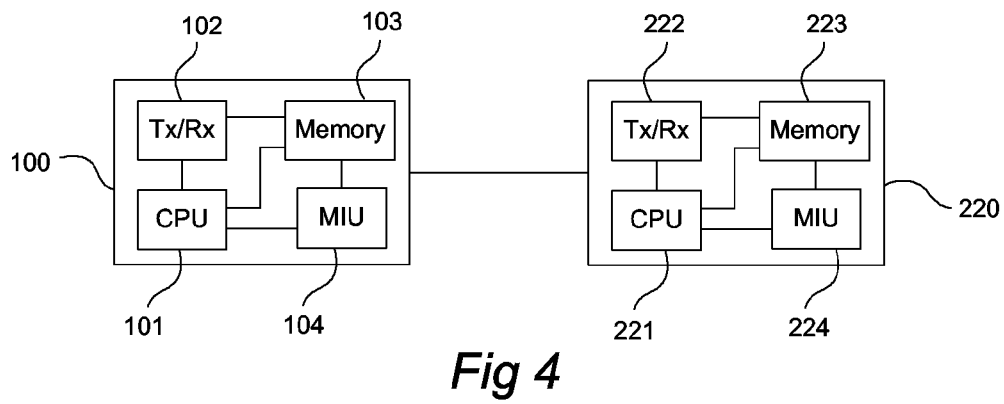
FIG. 4 is a block diagram of another embodiment of a handheld communication device connected to a network node.

FIG. 4 illustrates an embodiment being a combination of the embodiments of FIGS. 2 and 3, wherein both the handheld communication device 100 and the network node 220 comprise the MIU 104, 224.

The memories 103, 123, 133, 203, 223, may comprise a non-volatile memory, a volatile memory, a flash memory, a RAM (Random Access Memory), and/or a ROM (Read Only Memory). The different memories are jointly denoted by each of the reference numerals 103, 123, 133, 203, 223.

The Tx/Rx units 102, 122, 132, 202, 222 may be configured to communicate wirelessly, such as specified according to the GSM (Global System for Mobile communication), the PDC (Personal Digital Cellular), the 3GPP ($3^{rd}$ Generation Partnership Project), or the CDMA2000 (Code Division Multiple Access) specifications. Furthermore, Tx/Rx unit 102 and 132 may also be configured to communicate according to a short-range communication standard, such as the Bluetooth® or another WLAN (Wireless Local Area Network) standard. The handheld communication device 1, 100, 200 may also be a cordless or wire connected telephone unit, wherein Tx/Rx unit 102, 133 may be adapted for packet switched communication.

The handheld communication device 1, 100, 200 may be configured to receive a message, which is relayed by the base station 10a, 10b, 10c, 10d. The message may e.g. be a pure text message, such as an SMS (Short Message Service) message, an image, a video, or an audio message, or a combination thereof. The message may be conveyed in an SMS, an EMS (Enhanced Messaging Service), an MMS (Multimedia Message Service) message, an e-mail, a voice mail, an instant message, or a WAP-push (Wireless Application Protocol) message. A voice message, such as a commercial call generated by a human being, or a commercial call with a recorded voice message initiated by a computer may also be an unsolicited message depending on the preferences of the recipient. The message may also be received via server 21 or the external communication device 20. The server 21 may establish a connection to the handheld communication device 1, 100 when the device enters the coverage area of the LAN in which the server 21 is located.

The message may also be a SIP (Session Initiation Protocol) message. SIP provides a real time protocol mechanism so that end systems and proxy servers can provide services such as VoIP (Voice over IP), video telephony, instant messaging, fax delivery etc. SIP addresses users by SIP address, which is an email-like address. SIP addresses may also be embedded in web pages as URLs.

The message may also be a session initiation message. A sender or transmitter may send an initiation message to establish a connection to receiver. The initiation message may comprise the address and/or identity of the sender or the transmitter. Thus, in one embodiment session control may be provided either in the handheld communication device 100 and/or in the network node 120, 220. Data of the initiation message, which identifies the sender or transmitter, may be compared to the data information in the MIU 104, 224. If the MIU 104, 224 comprises data information associated with the data, which identifies the sender or transmitter, request for the connection may be denied. The session control may e.g. be provided for telephone calls, establishing of a VoIP connection, a chat connection, etc.

When the message is received in the handheld communication device 1, 100, 200 message information associated with the message, and possibly the message as such, is stored in the memory 103, 203. The message information may be shown as an item in an inbox, such as an inbox for an e-mail, an SMS, an EMS, an MMS, or an instant message, or a telephone number box for incoming calls. The item may be presented on a display 2 of the handheld communication device. The items in the inbox may be scrolled and selected by means of a user interface of the handheld communication device 1, such as a keypad 3, a joystick 4, a rocker key, a touch pad, and/or a scroll button. The message information may comprise a link to the storage location of the message, to which the information is related. The link may refer to a position within the memory 103, 203 of the handheld communication device 1, 100, 200.

The message information associated with the message may be a withheld note indicating that the identity of the sender of the message was withheld, at least for the user of the handheld communication device 1, 100, 200 in which the message was received.

Alternatively, the message may comprise data identifying the sender of the message, such as a telephone number, a URI (Universal Resource Indicator), such as a URL (Universal Resource Locator) or a URN (Universal Resource Name), a Bluetooth® identity, an e-mail address, IM id (Instant Message identifier), such as an ICQ®, AIM® (AOL Instant Messaging) or Wireless Village id), a computer/server id, such as an IP (Internet Protocol) address, IMSI (International Mobile Station Identifier), IMEI (International Mobile Equipment Identifier), WLAN (Wireless Local Area Network) id, Ethernet id, computer domain login, such as Linux, Unix or Windows® login, an SIP address and/or geographical position of transmitting entity (longitude/latitude). Said data may be stored in the handheld communication device 1, 10, 200 upon reception of the message.

The handheld communication device 1, 100, 200 may comprise a deletion function or dedicated "delete" button to simply delete the message information associated with a specific message. Alternatively, or additionally, the deletion function and/or another dedicated button may comprise a "delete as unsolicited" function. The delete as unsolicited function may comprise a "delete as global unsolicited" and a "delete as personal unsolicited" function. When the "delete as global unsolicited" function is utilized the associate message will ultimately be considered as unsolicited for multiple handheld communication devices, whereas when the "delete as personal unsolicited" function is utilized, the message or a message from a certain sender may be blocked at the handheld communication device 1. When the "delete as personal unsolicited" function is used, data associated with the deleted message information need not be transmitted to the network node 120, 220, as it is used for setting up a local rule for blocking messages. A message comprising an offer for sale of a certain merchandise may e.g. be deleted with the "delete as unsolicited global" function as it is likely that others do not want this message. A message from a certain sender, such as from an ex girl friend, may be deleted with the "delete as personal" function, as it is likely that others want messages from the certain sender.

When the message information is deleted with the "delete as unsolicited" function, the message associated with the message information is regarded as unsolicited. The delete as unsolicited function may be accessible through a menu presented in the display 2, and may be executed by e.g. pushing a button of the keypad 3, the joystick 4, or similarly.

In response to deleting the message information associated with the unsolicited message, data associated with the deleted information, and thus with the unsolicited message, is forwarded to the MIU 104, 224. The forwarded data associated with the deleted information may be a telephone number, a URI, a URL, an IP (Internet Protocol) address, an e-mail address, an SIP address, a time of arrival of the message at the handheld communication device 1, 100, 200, a time of forwarding of the message from the network node 120, 220 to handheld communication device 1, 100, 200, or any of the information received in the message as described above. The geographical position, such as a certain geographical area or a specific latitude and longitude of the transmitter, may also be used for identifying the message. The geographical position may also be determined by determining which network node, such as a certain base station 10*a*, 10*b*, 10*c*, 10*d*, forwarded the message. The geographical position may also be included in the message as such. The forwarded data may also be the message as such. The forwarded data may have been included in the unsolicited message when it was received.

Data information stored in the MIU 104, 224 may be updated based on the forwarded data. The MIU 104, 224 may comprise a heuristic filter or content based filter, such as a Bayes filter. The content based filter may be used to extract the data information from the forwarded data. The extracted information may be used to set up rules for scanning incoming messages before they are notified in and/or forwarded to the handheld communication device 1, 100, 200. If the forwarded data is a telephone number, an IP address, an e-mail address, an SIP address, a URI and/or a URL, the data information stored in the MIU 104, 204 may be a list of telephone numbers, IP addresses, e-mail addresses, SIP addresses, URIs and/or URLs. An incoming message may be scanned for such information to be compared with the information in the MIU 104, 204.

If the forwarded data is a time of arrival, as may be the case if the identity of the entity that transmitted the message was withheld, and the MIU 224 is located in the network node 120, the MIU 224 may store data information associated with the time of arrival of the message, which has not been forwarded to the handheld communication device 1, 100, 200. The data information associated with the time of arrival may e.g. be a telephone number, an IP address, an SIP address a URI or a URL. Also, the MIU 224 may store the time the message was dispatched to a specific handheld communication device 1, 100, 200. When forwarded data associated with an unsolicited message is received in the MIU 224 of a network node 220, the forwarded time of arrival is compared to the time of dispatch stored in the MIU 224. If the time of arrival and the time of dispatch are related, e.g. a difference of e.g. a few seconds, the message associated with the time of dispatch will be considered being an unsolicited message. Said difference has to be set in each implementation depending on the time it takes from dispatch until registration of arrival. When the time of arrival data has been forwarded, the MIU 224 may update the data information stored therein, e.g. with a telephone number, an IP address, an e-mail address, an SIP address a URI or a URL. Alternatively, if the identity of the transmitting entity is withheld, the data payload of the unsolicited message may be forwarded to the MIU 104, 224 as data associated with the message, which data payload may be the renderable data of the message.

In one embodiment, the data information stored in the MIU 104, 224, may comprise at least one counter. Each counter may be associated with each entry in the MIU 104, 224, such as extracted info, a telephone number, an IP address, an e-mail address, an SIP address, a URI and/or a URL. Updating an entry of the MIU 104, 224 may comprise incrementing the counter. If the data information associated with the forwarded data already exists in the MIU 104, 224, only the counter needs to be incremented. However, if no data information of an unsolicited message is present in the MIU 104, 224 an entry may be created with information associated with the unsolicited message and a counter associated therewith. The use of the information in the counter is described below.

As mentioned above, the MIU 104, 224 may be located in the handheld communication device 1, 100, 200 and/or the network node 120, 220. Thus, message data extracted from an incoming message intended for and addressed to the handheld communication device 1, 100, 200 may be compared with the data information stored in the MIU 104, 224 before the message, or a notification thereof, is forwarded to or notified in the handheld communication device 1, 100, 200. The extracted data may be keywords of the message, a telephone number, an e-mail address, an IP address, an SIP address, a URI or a URL. If the MIU is located in the network node 120, 220 and it is determined that the incoming message is an unsolicited message, the incoming message or a notification thereof do not need to be transmitted to the handheld communication device 1, 100, 200. This is an advantage as processing of incoming data in the handheld communication device 1, 100, 200 may be reduced, wherein power is saved.

If the information in the MIU 104, 224 comprises a counter, the value of the counter may be checked before a message is blocked. If the counter is below a predetermined level, the message or a notification thereof may be transmitted or issued even though data information associated with the message is stored in the MIU 104, 224. The predetermined level may be set in each implementation, e.g. in dependence of the size of the network in which the MIU is located. Having a predetermined level for how many times the counter or the data information associated therewith has been encountered has the advantage that misuse of the system is counteracted and the effect of messages being reported as unsolicited may eliminated. The counter value may be required to be in excess of five before blocking notification of a related message in a small network. In another embodiment, the counter value may be required to be in excess of 1000 before blocking of notification of a related message in a larger network. Furthermore, the counter may be reset, e.g. if a message has been incorrectly classified as unsolicited Data information associated with unsolicited messages may be shared between handheld communication devices in the network in which they are operative. When data associated with unsolicited messages are forwarded from several handheld communication devices to a network node 120, 220 the reliability of the information in the MIU 224 may increase. Assume e.g. that data associated with a certain message has been reported as being an unsolicited message by 1000 units, the users of e.g. 100,000 other units to which the message might be transmitted will probably also consider the message as being unsolicited. Thus, it is an advantage that unsolicited messages may be blocked as early as possible, whereby the risk of flooding servers and/or network nodes may be reduced.

The data information of the MIU 224 in the network node 120, 220 may be shared between different network nodes and may be transmitted between them. If a first network node e.g. is base station controller 11*a*, the data information of its MIU 224, may be transmitted to a second network node, e.g. base station controller 11*b*.

The MIU 104, 224 may comprise several lists in which different types of data information is included, at lest one for each of a telephone number, an SMS/MMS, and/or an e-mail list. Then, depending on the type of data information in the list, the list may be shared with different network nodes or different types of handheld communication devices.

If the MIU 104 is located in the handheld communication device 100, the data information therein may be shared with a network node 120, which may be a local network node such as the server 21, or a network node of a wide area network. This is an advantage, as filters for blocking unsolicited messages may be set up locally, such as within an office space. Furthermore, the data information in the MIU 104 of the handheld communication device 1, 100 may be shared with a single external communication device 130.

An unsolicited message may in one embodiment be blocked in dependence of the geographical position of the handheld communication device 1, 100, 200. Data information in the MIU 224 of the network node 120, 220 may be used for blocking messages to a handheld communication device 1, 100, 200 being located in the domain of the network node 120, 220. For example, a handheld communication device 1, 100, 200 may be within the coverage area of a base station 10*a*, 10*b*, 10*c*, 10*d* controlled by a base station controller 11*a*, 11*b* comprising an MIU 224. The handheld communication device 1, 100, 200 may receive a message through a LAN, e.g. from server 21. This situation may e.g. occur in a shopping mall. Data associated with the unsolicited message may be forwarded to the MIU 224 of the network node 120, 220. Then, when another handheld communication device signs in at the domain of the network node, e.g. when entering the coverage area of a base station 10*a*, 10*b*, 10*c*, 10*d* serviced by a certain base station controller 11*a*, 11*b*, data information stored in the MIU 224 of the network node 220 may be transmitted to the MIU 104 of the other handheld communication device 100. When any of the handheld communication devices are changing position from the domain of a first network node to a the domain of a second network node, the handheld communication device 100 may download or receive data information, which is stored in the second network node, from the network. The data information may be received automatically when the handheld communication device enters into the domain of the network node 220. This may be effective to stop peer-to-peer messages in a local network, if an identifier identity of the transmitting entity of the local network is known to the handheld communication device 1, 100. The received data information may be stored in the handheld communication device even after the handheld communication device has left the domain of a network node, such as a predetermined period of time. If the handheld communication device 1, 100, 200 does not re-enter the domain of a previously visited network node 220, the data information received from that network node will be deleted.

The geographical position of the handheld communication device 1, 100, 200 may also be determined by a GPS (Global Positioning System) unit in the handheld communication device. When the handheld communication device 1, 100, 200 reports its geographical position, updating data for updating the data information in the MIU 104 of the handheld communication device 100 may be transmitted to it in response to receiving the geographical position in the network node 120, 220. The geographical position may also be determined when the handheld communication device enters into the domain of a network node, such as during a roaming service.

In one embodiment, an incoming message or a notification thereof is always transmitted from the network node 220 to the addressed handheld communication device 200. In response to receiving the message, the handheld communication device 200 may transmit a scanning request. When the network node 220 receives the scanning request, it compares message data extracted from the message intended for the handheld communication device 100 with data information stored in the MIU 224. A scanning response with information of the outcome of the comparing may be transmitted to the handheld communication device 200, which may choose to display the notification or message depending on settings of the device. One user may desire to always receive messages, irrespective of whether it is an unsolicited message or not, whereas another user may desire to never receive unsolicited messages.

Figure 5:
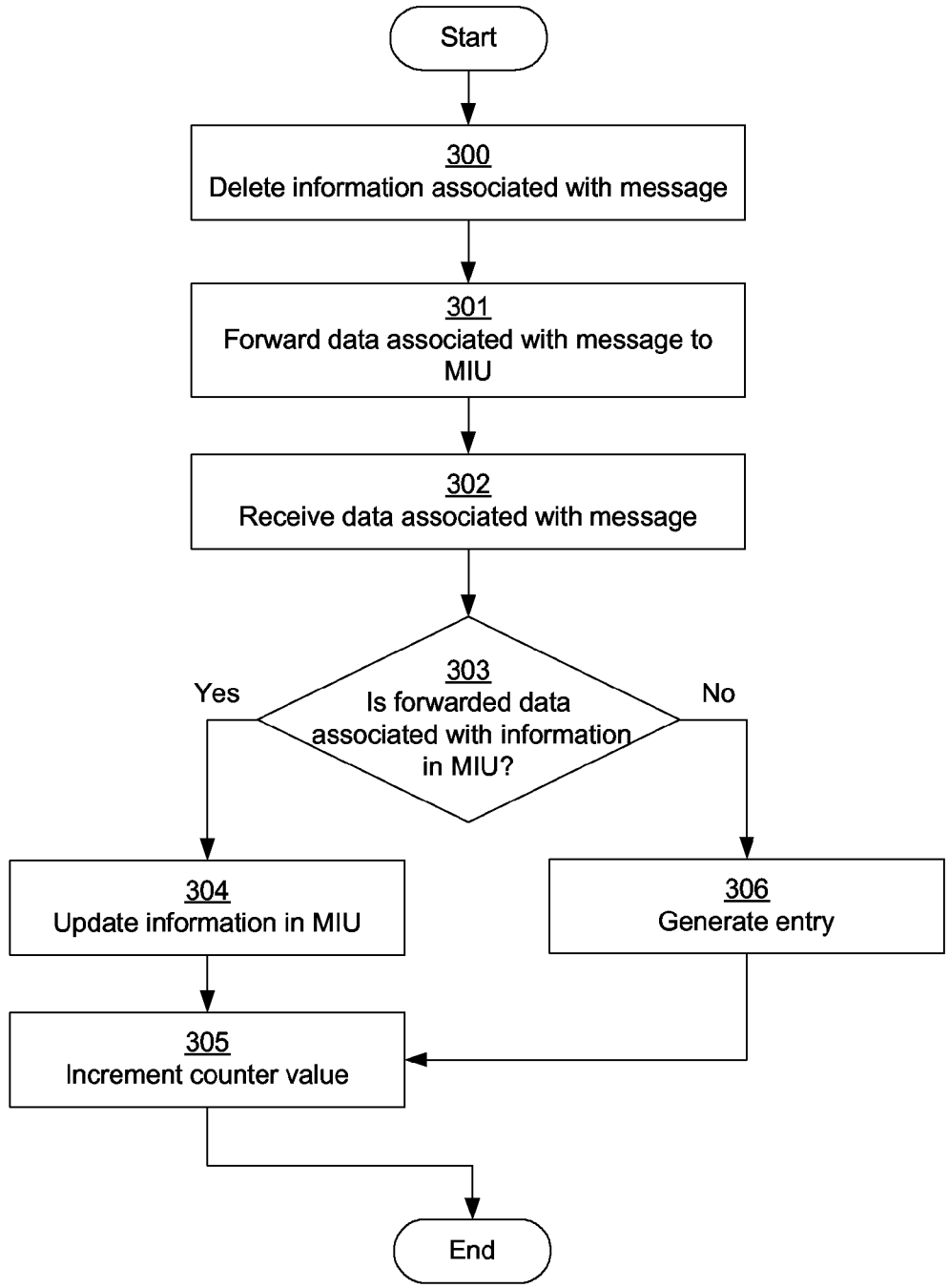
FIG. 5 is a flow-chart of a method for gathering information relating to data associated with an unsolicited messages.

FIG. 5 is a flowchart of one embodiment of a method for gathering information of unsolicited messages. In a first step 300, message information associated with an unsolicited message is deleted, because the user has determined that the message related to the message information pertains to an unsolicited message that the user thought was unsolicited of one or the other reason. The message information or the entire message is deleted with a specific action or menu item associated with the action of deleting unsolicited messages. There is also a specific action for deleting ordinary, solicited messages, which does not result in the method steps according to the present invention.

In step 301 data associated with the deleted information, and thus with the unsolicited message, is forwarded to the MIU 104, 224. Such data may be a telephone number, an e-mail address, an SIP address, a URI, a URL etc as described above. In step 302, the forwarded data is received in the MIU 104, 224, i.e. received in either the handheld communication device 1, 100 or the network node 220. In step 303 it is determined if any data information, which is related to the forwarded data, is already stored in the MIU 104, 224. If the answer in step 303 is yes, the information is already present in the MIU 104, 224. However, the data information may need to be updated in step 304, for example based on the forwarded data, such as if the entire message has been forwarded, the rules set up for scanning messages may be updated. Then the procedure proceeds to step 305. If the answer in step 303 is no, the procedure proceeds to step 306, wherein the data information in the MIU 104, 224 is updated, e.g. by generating an entry with data information associated with the forwarded data. Also, a counter associated with the new entry may be generated and set to an initial value, such as zero. Then, the procedure proceeds to step 305. In step 305 the counter associated with the updated data information is incremented, e.g. by one, whereupon the procedure is ended.

If the updating only means to increment the counter value, step 304 may be excluded.

As is understood, some or all of the steps of FIG. 5 may be carried out in the handheld communication device 1, 100, 200 and some or all of the steps may be carried out in the network node 120, 220, depending on where the MIU 104, 224 is located.

Figure 6:
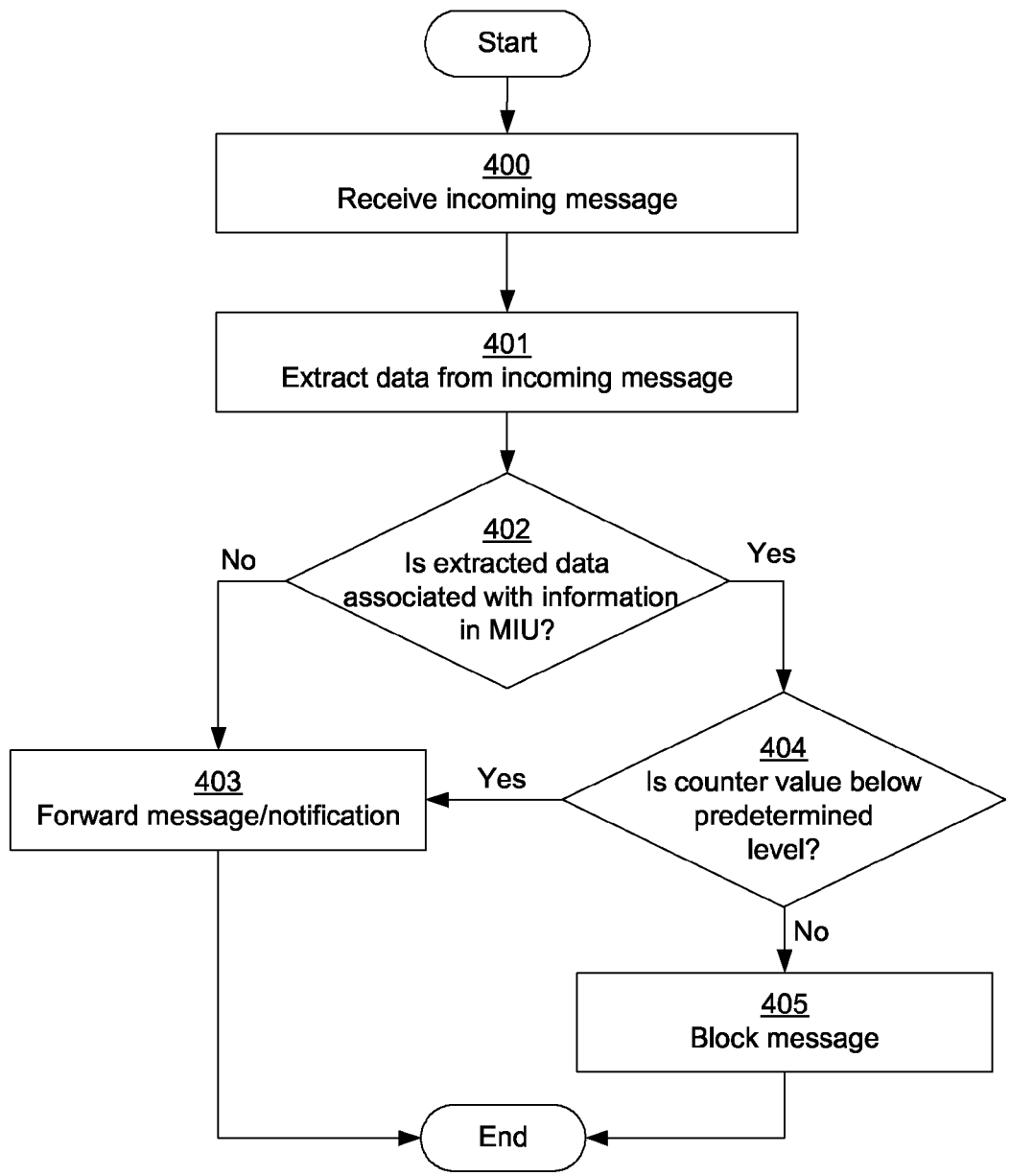
FIG. 6 is a flow-chart of a method for blocking a message from being notified in a handheld communication device.

FIG. 6 illustrates one embodiment of a method for blocking a message from being notified in a handheld communication device 1, 100, 200. To block messages, the MIU 104, 204 may initially be updated as described in relation to FIG. 5. In a first step 400 an incoming message intended for and addressed to a specific handheld communication device 100 is received. In step 401, message data is extracted from the incoming message. Such data may be a telephone number, an e-mail address, an SIP address, a URI address, a URL address etc, as mentioned above. In step 402, it is determined whether the extracted message data associated with the incoming message is associated with data information in the MIU 104, 224. If the answer in step 402 is no, the message is notified in or forwarded to the handheld communication device 1, 100, 200 in step 403, whereupon the procedure is ended. If the answer in step 402 is yes, the procedure proceeds to step 404, wherein it is determined whether the value of the counter associated with the data information, with which the message data is associated, is below a predetermined level, such as five. If the answer in step 404 is yes, the procedure proceeds to step 403. If the answer in step 402 is no, the message is blocked in step 405, wherein the incoming message is not notified in or forwarded to the handheld communication device 1, 100, 200, wherein the procedure is ended. When the message has been blocked, all data and information relating to the message is deleted from the memory of the communication device 1, 100, as well as from the memory of the network node. Alternatively, the message is saved some hours or days before being deleted permanently. If the user changes his settings of the blocking service, for example to a state wherein a blocked message may be notified, such old messages may be retrieved and notified.

A message may also be automatically be deleted if it has been received by the handheld communication device 1, 100. If data information stored in the MIU 104 is updated regularly, such as a certain number of times per hour, day, week, month etc. the MIU 104 may scan e.g. an inbox when it has been updated. The data information stored in the MIU 104 may also be updated automatically by transmitting push message with updated data information from the network node 120 to the handheld communication device 1. Thus, no update request needs to be transmitted from the handheld communication 1, 100 device to the network node 120 for requesting downloading of updated data information. If the inbox comprises a message that is unsolicited, but was not unsolicited before updating the MIU 104, the unsolicited message may be deleted automatically. This may also be applied in a network node 221 if messages are temporarily stored therein before delivery.

Some or all of the steps of FIG. 6 may be carried out in the network node 120, 220 and some or all of the steps may be carried out in the handheld communication device 1, 110, 200 depending on where the MIU 104, 224 is physically located.

The methods according to FIGS. 5 and 6 may be implemented by a computer program product comprising program code means for carrying out the methods. The computer program product may be run e.g. by any of controllers 101, 121, 131, 201, 221, depending on the specific implementation. Furthermore, the function of the MIU 104, 134, 224 can be implemented by program code means run by said controllers, and the information stored in MIU 104, 134, 224 may be stored in memory 103, 123, 133, 223, respectively. Alternatively, MIU 104, 134, 224 are implemented as stand-alone units, which may be implemented in software, hardware, or a combination of software and hardware, e.g. by a CPU, a FPGA (Field Programmable Gate Array), or an ASIC (Application Specific Integrated Circuit).

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for gathering information relating to unsolicited messages, comprising:
   extracting message data in a handheld communication device from an unsolicited message received by the handheld communication device;
   deleting by said handheld communication device message information associated with a-A said unsolicited message received by the handheld communication device;
   forwarding said message data, to a message information unit located either in the handheld communication device or in a network node;
   updating data information previously stored in a memory of said message information unit based on said forwarded message data associated with said unsolicited message, wherein updating further comprises increasing a counter value which is indicating the number of times the stored data information has been encountered; wherein
   if the message information unit is located in the handheld communication device:
      exporting at least a portion of the stored data information to an external electronic communication device; or
   if the message information unit is located in a network node:
      transmitting at least a portion of the stored data information in the message information unit from the network node to at least a further network node; and
   issuing a notification to the handheld communication device if the data information is related to the message data extracted from the incoming message and the counter value is lower than a predetermined number.

2. The method according to claim 1, comprising comparing message data extracted from an incoming message, which is addressed to the handheld communication device, with said data information stored in the message information unit to determine whether the message should be notified in or forwarded to the handheld communication unit.

3. The method according to claim 2, comprising issuing the notification or forwarding the message;
   if the data information stored in the message information unit does not comprise any data information related to the message data extracted from the incoming message, or
   if the data information is related to the message data extracted from the incoming message and a counter value indicating the number of times the stored information has been encountered is lower than a predetermined number.

4. A method for blocking a message intended for and addressed to a handheld communication device operative in a communication network, said communication network comprising a message information unit comprising data information related to messages determined to be unsolicited, said method comprising:
   extracting message data from the message intended for the handheld communication device;
   comparing the message data in the addressed handheld communication device with said data information stored in said message information unit to determine whether the message should be notified in or transmitted to the handheld communication device being addressed in the message;
   increasing a counter value which is indicating the number of times the stored data information has been encountered;
   blocking the message to the handheld communication device if the data information is related to the message data extracted from the incoming message and the counter value is not lower than a predetermined number; and
   transmitting the data information in the message information unit arranged in a network node from the network node to at least one further handheld communication device operative in the domain of the network node.

5. The method according to claim 4, comprising transmitting the data information in the message information unit in response to the handheld communication device signing in at the domain of the network node.

6. The method according to claim 4, wherein the step of comparing is carried out in the addressed handheld communication device.

7. The method according to claim 6, comprising exporting at least a portion of the stored data information to an external electronic communication device.

8. The method according to claim 4, wherein the step of comparing is carried out in the network node.

9. The method according to claim 8, comprising:
   transmitting the message to the addressed handheld communication device;
      carrying out the step of comparing upon receiving a request therefor from the handheld communication device; and
      transmitting a response with information of the outcome of the step of comparing.

10. A device for gathering information relating to unsolicited messages, comprising:
    a controller configured to delete in a handheld communication device message information associated with an unsolicited message received by the handheld communication device;
    wherein the controller is configured to extract and forward message data, associated with the deleted message information or the unsolicited message, to a message information unit located in the handheld communication device;
    the message information unit is configured to update data information stored in a memory of said message information unit based on said forwarded message data associated with said unsolicited message and to increase a counter value which is indicating the number of times the stored data information has been encountered;
    the controller is configured to be responsible for exporting at least a portion of the stored data information to an external electronic communication device, and issuing a notification to the handheld communication device if the data information is related to the message data extracted from the incoming message and the counter value is lower than a predetermined number; and the device is included in the handheld communication device.

11. The device according to claim 10, wherein the controller is configured to compare message data extracted from an incoming message, which is addressed to the handheld communication device, with said data information stored in the message information unit to determine whether the message should be notified in the handheld communication device.

12. The device according to claim 11, wherein the controller is configured to be responsible for issuing the notification;
   if the data information stored in the message information unit does not comprise any data information related to the message data extracted from the incoming message, or
   if the data information is related to the message data extracted from the incoming message and a counter value indicating the number of times the stored information has been encountered is lower than a predetermined number.

13. The device according to claim 10,
   wherein the device is included in a portable radio communication equipment, a mobile radio terminal, a pager, a communicator, an electronic organizer, a personal digital assistant (PDA), a handheld computer, a handheld VoIP telephone, or a smartphone.

14. The device according to claim 10, wherein the device is included in a mobile telephone.

15. A device for gathering information relating to unsolicited messages, comprising:
   a controller configured to extract and forward message data, associated with message information—that has been received and deleted in a handheld communication device by a controller of the handheld communication device—of an unsolicited message, to a message information unit located in a network node;
   the message information unit is configured to update data information stored in a memory of said message information unit based on said forwarded message data associated with said unsolicited message, and to increase a counter value which is indicating the number of times the stored data information has been encountered; and
   the controller is further configured to be responsible for transmitting the data information in the message information unit from the network node to at least a further network node, and
   issue a notification to the handheld communication device if the data information is related to the message data extracted from the incoming message and the counter value is lower than a predetermined number.

16. The device according to claim 15, wherein the controller is configured to compare message data extracted from an incoming message, which is addressed to the handheld communication device, with said data information stored in the message information unit to determine whether the message should be notified in or forwarded to the handheld communication unit.

17. The device according to claim 16, wherein the controller is configured to be responsible for forwarding the message;
   if the data information stored in the message information unit does not comprise any data information related to the message data extracted from the incoming message, or
   if the data information is related to the message data extracted from the incoming message and a counter value indicating the number of times the stored information has been encountered is lower than a predetermined number.

18. The device according to claim 15, wherein the device is included in a network node.

19. A device for blocking a message intended for and addressed to a handheld communication device operative in a communication network, comprising:
   a message information unit comprising stored data information related to messages determined to be unsolicited; and
   a controller for extracting message data from the message intended for the handheld communication device, and comparing the message data in the addressed handheld communication device with said data information stored in said message information unit to determine whether the message should be notified in or transmitted to the handheld communication device being addressed in the message, and increasing a counter value which is indicating the number of times the stored data information has been encountered;
   wherein the message information unit and the controller are arranged in a network node, the controller being configured to be responsible for transmitting the data information in the message information unit from the network node to at least one further handheld communication device operative in the domain of the network node; and
   the controller for blocking the message to the handheld communication device if the data information is related to the message data extracted from the incoming message and the counter value is not lower than a predetermined number.

20. The device according to claim 19, wherein the controller is configured to transmit the data information in the message information unit in response to the handheld communication device signing in at the domain of the network node.

21. The device according to claim 19, wherein the controller is configured to be responsible for
   transmitting the message to the addressed handheld communication device;
   carrying out the comparing of the message data with said data information stored in said message information unit upon receiving a request therefor from the handheld communication device; and
   transmitting a response with information of the outcome of the comparing.

22. A device for blocking a message intended for and addressed to a handheld communication device operative in a communication network, comprising:
   a message information unit comprising stored data information related to messages determined to be unsolicited; and
   a controller for extracting message data from the message intended for the handheld communication device, and comparing the message data in the addressed handheld communication device with said data information stored in said message information unit to determine whether the message should be notified in the handheld communication device being addressed in the message, and increasing a counter value which is indicating the number of times the stored data information has been encountered;
   wherein the controller is located in the addressed handheld communication device; and
   the controller is configured to be responsible for exporting at least a portion of the stored data information to an external electronic communication device, and
   blocking the message to the handheld communication device if the data information is related to the message data extracted from the incoming message and the counter value is not lower than a predetermined number.

23. The device according to claim 22, wherein the device is included in a portable radio communication equipment, a mobile radio terminal, a pager, a communicator, an electronic organizer, a personal digital assistant (PDA), a handheld computer, a handheld VoIP telephone, or a smartphone, which is the addressed handheld communication device.

24. The communication device according to claim 22, wherein the device is included in a mobile telephone, which is the addressed handheld communication device.

25. A non-transitory computer readable medium storing executable program code to carry out the method according to claim 1.

26. A non-transitory computer readable medium storing executable program code to carry out the method according to claim 4.

* * * * *

UNITED STATES PATENT AND TRADEMARK OFFICE
CERTIFICATE OF CORRECTION

PATENT NO. : 8,478,241 B2  Page 1 of 1
APPLICATION NO. : 11/720938
DATED : July 2, 2013
INVENTOR(S) : Martin Kretz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this
Eighth Day of September, 2015

Michelle K. Lee
*Director of the United States Patent and Trademark Office*